(12) United States Patent
Griepentrog

(10) Patent No.: US 8,177,174 B2
(45) Date of Patent: May 15, 2012

(54) MONITOR LIFT MECHANISM

(75) Inventor: Dennis G. Griepentrog, DePere, WI (US)

(73) Assignee: Krueger International, Inc., Green Bay, WI (US)

( * ) Notice: Subject to any disclaimer, the term of this patent is extended or adjusted under 35 U.S.C. 154(b) by 0 days.

(21) Appl. No.: 12/968,360

(22) Filed: Dec. 15, 2010

(65) Prior Publication Data

US 2011/0155867 A1    Jun. 30, 2011

Related U.S. Application Data

(60) Provisional application No. 61/291,162, filed on Dec. 30, 2009.

(51) Int. Cl.
   *A47F 5/00*    (2006.01)
(52) U.S. Cl. ............... 248/125.2; 248/188.2; 248/162.1; 108/50.01
(58) Field of Classification Search .............. 248/188.2, 248/162.1, 161; 108/50.01, 50.02, 147, 147.19
   See application file for complete search history.

(56) References Cited

U.S. PATENT DOCUMENTS

| | | | |
|---|---|---|---|
| 4,314,647 A | 2/1982 | Harris et al. | |
| 4,718,740 A | 1/1988 | Cox | |
| 4,828,342 A | 5/1989 | Stefan | |
| 4,836,623 A | 6/1989 | Holland | |
| 5,101,736 A | 4/1992 | Bommarito et al. | |
| D335,225 S | 5/1993 | Ugalde | |
| 5,242,217 A | 9/1993 | Gonnet | |
| 5,364,177 A | 11/1994 | Ugalde | |
| 5,368,377 A | 11/1994 | Baines | |
| 5,437,235 A | 8/1995 | Randolph | |
| 5,685,231 A | 11/1997 | Eyre | |
| 5,746,489 A | 5/1998 | Moon | |
| 5,758,849 A | 6/1998 | Bui et al. | |
| 5,758,935 A | 6/1998 | Coonan | |
| 5,957,059 A | 9/1999 | Burhman | |
| 6,059,385 A | 5/2000 | Guhl | |
| 6,170,406 B1 | 1/2001 | Klein et al. | |
| 6,327,983 B1 | 12/2001 | Cronk et al. | |
| 6,352,226 B1 * | 3/2002 | Gordon | 248/125.2 |
| 6,446,564 B1 | 9/2002 | Anderson | |
| 6,494,150 B1 | 12/2002 | Phoenix et al. | |
| 6,508,526 B2 | 1/2003 | Reppas et al. | |
| 6,609,465 B2 | 8/2003 | Kolavo | |
| 6,612,670 B2 | 9/2003 | Liu | |
| 6,846,052 B2 | 1/2005 | Kelley et al. | |
| 6,902,243 B2 | 6/2005 | Bober | |
| 6,913,332 B1 | 7/2005 | Besterfield et al. | |
| 7,063,024 B2 * | 6/2006 | Latino | 108/50.01 |
| 7,128,003 B2 * | 10/2006 | Okninski | 108/147 |
| 7,207,278 B2 | 4/2007 | Latino et al. | |
| 7,410,226 B1 * | 8/2008 | Meskan | 312/7.2 |

(Continued)

*Primary Examiner* — Terrell McKinnon
*Assistant Examiner* — Monica Millner
(74) *Attorney, Agent, or Firm* — Andrus, Sceales, Starke & Sawall, LLP

(57) ABSTRACT

A monitor lift mechanism that can be utilized in connection with a desk having a stationary work surface. The monitor lift mechanism is movable between a retracted position in which a monitor is positioned beneath the work surface, and an extended position in which the monitor is positioned above the work surface for viewing. The monitor lift mechanism includes a lift bar that is movable between a retracted position and an extended position through the use of a block and tackle pulley and lift cylinder arrangement. A latch mechanism holds the lift bar in the retracted position and can be released upon depression of a monitor door coupled to the lift bar.

17 Claims, 10 Drawing Sheets

U.S. PATENT DOCUMENTS

| | | | |
|---|---|---|---|
| 7,584,705 B2 * | 9/2009 | Chen | 108/50.01 |
| 7,665,709 B2 * | 2/2010 | Cvek | 248/669 |
| 7,806,490 B1 * | 10/2010 | Buehl | 312/312 |
| 7,922,267 B2 * | 4/2011 | Gevaert | 312/223.3 |
| 2002/0079788 A1 | 6/2002 | Canedy et al. | |
| 2003/0193275 A1 | 10/2003 | Canedy et al. | |
| 2003/0209955 A1 | 11/2003 | Canedy et al. | |
| 2004/0221775 A1 | 11/2004 | Okninski | |
| 2005/0002591 A1 | 1/2005 | Buitmann | |
| 2006/0000955 A1 | 1/2006 | Cvek | |
| 2006/0161993 A1 | 7/2006 | Cvek | |
| 2006/0238086 A1 * | 10/2006 | Lai | 312/319.5 |
| 2008/0060560 A1 | 3/2008 | Chen | |
| 2009/0039743 A1 | 2/2009 | Gevaert | |

\* cited by examiner

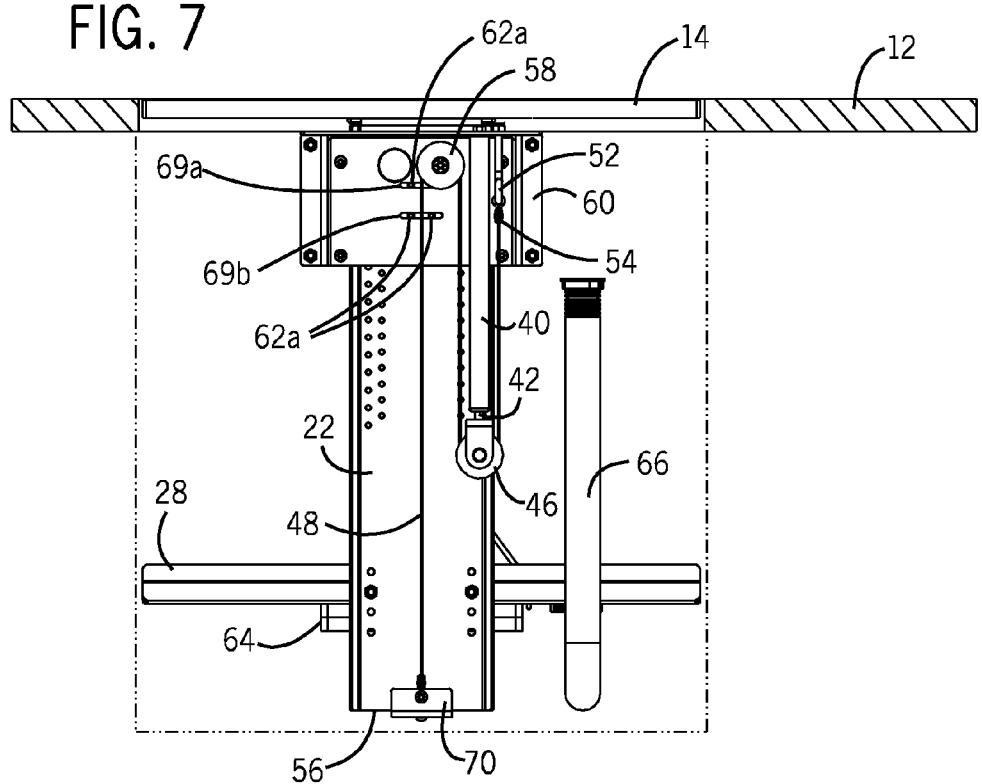
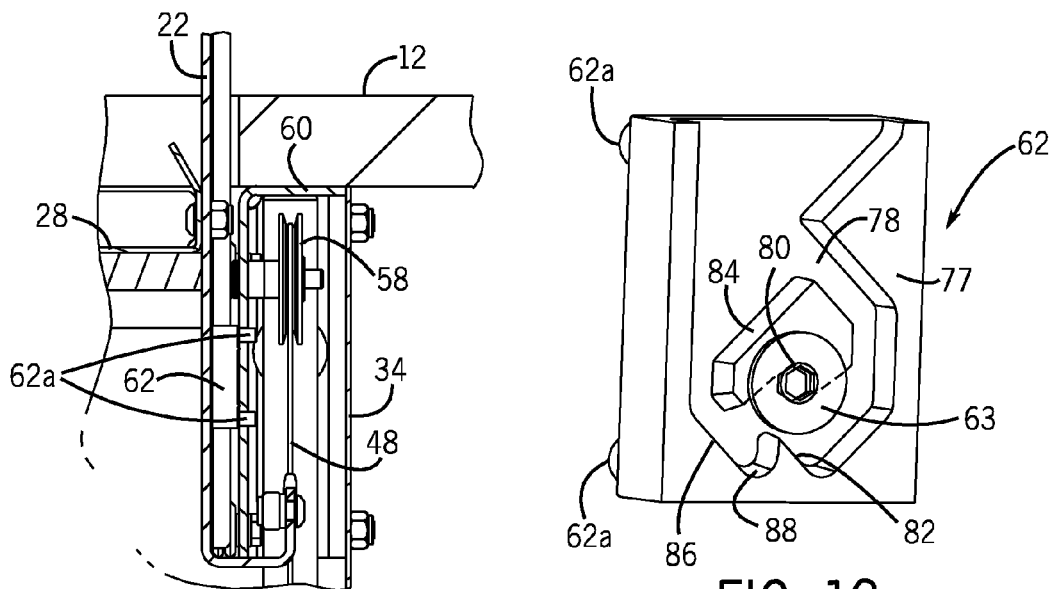

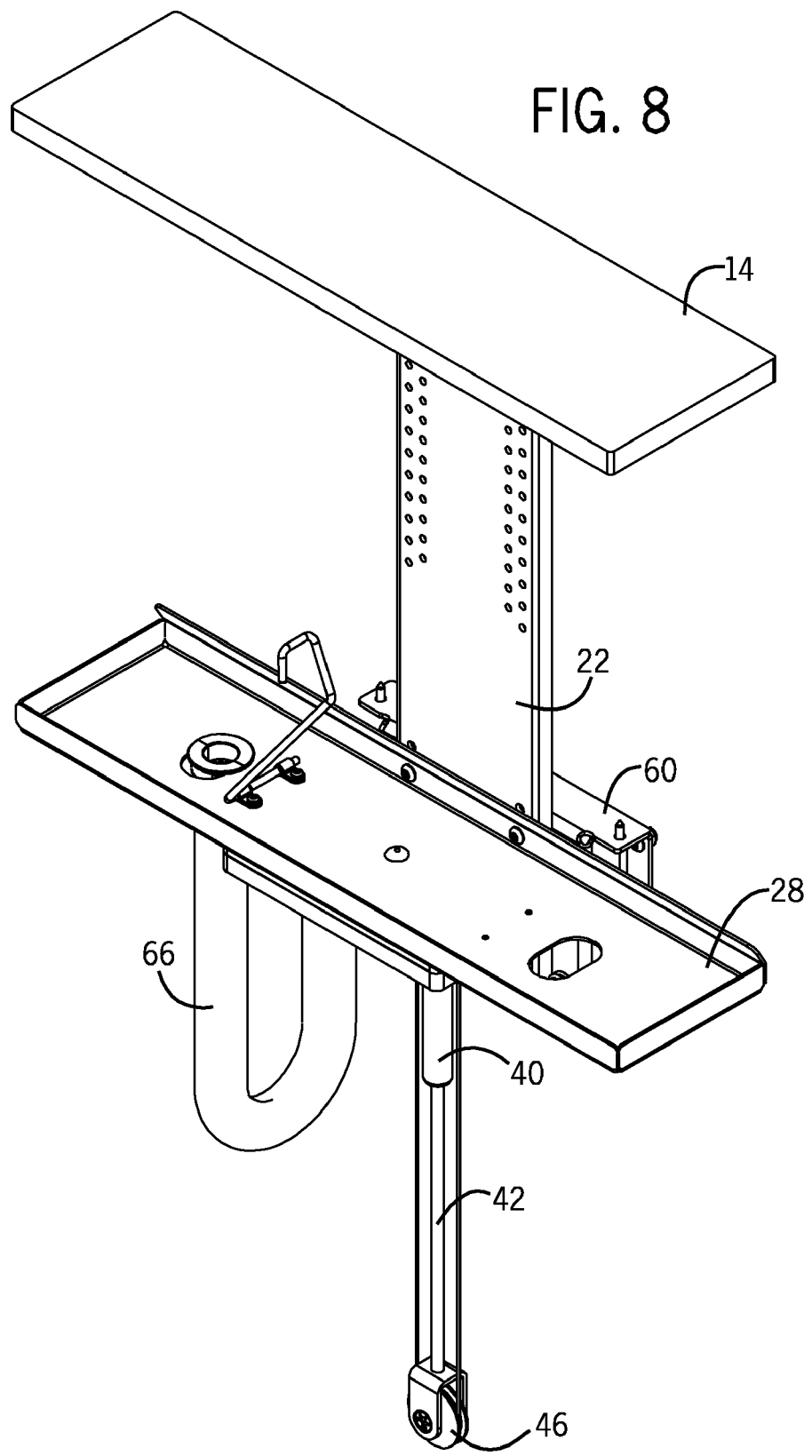

MONITOR LIFT MECHANISM

CROSS REFERENCE TO RELATED APPLICATION

The present application relates to and claims priority from U.S. Provisional Patent Application Ser. No. 61/291,162, filed Dec. 30, 2009, which is fully incorporated herein by reference.

BACKGROUND OF THE INVENTION

The present disclosure generally relates to tables and/or computer work stations for use in instructional environments. More specifically, the present disclosure relates to a mechanism that allows a monitor to move between a concealed, storage position and an extended, viewing position when needed.

The dramatic increase in the usage of computers and computer monitors in classrooms, lecture halls and meeting rooms has necessitated multi-purpose rooms that can be converted from a computer-based classroom environment to a conventional lecture hall or laboratory requiring writing or drafting space. As an example, in some configurations, the room may require a flat work surface for text, written materials and conventional note taking along with an unobstructed view of the surrounding areas. In other configurations, the room may require the use of video monitors and keyboards for data entry into a computer coupled to the monitor.

In some cases, tables have been designed to incorporate a method of mechanically raising a monitor from beneath a table surface, such as taught by U.S. Pat. Nos. 4,735,467 and 6,609,465. However, each of these convertible tables requires a substantial mechanism to lift and lower the display. Such equipment requires regular maintenance, may be expensive, and may significantly impair a user's ability to see a presenter and substantial parts of the use area.

SUMMARY OF THE INVENTION

The present disclosure relates to a monitor lift mechanism that attaches to a desk. The design of the present disclosure allows a user to store and secure a monitor, keyboard and mouse below a work surface when not in use, and quickly and easily raise the monitor and peripherals to a position above the desk surface when needed. The monitor lift mechanism allows a room to be converted for multiple uses, such as in transforming a computer lab to a study or lecture hall that may not require a computer monitor.

The monitor lift mechanism includes a steel housing that acts as a storage compartment for a lift cylinder mounted to the work surface. A roller bracket weldment is mounted to the bottom surface of the work surface and includes four rollers that provide the guide and bearing surface for a steel lifting bar to which a monitor is attached. A block and tackle pulley arrangement attached to the housing and the lift bar provide the lifting power to move the monitor from a retracted, storage position to an extended, viewing position. Preferably, a latch mechanism keeps the lift bar and door in the stored position and can be released to allow the monitor to move to the extended position. A keyboard and mouse can be stored on a shelf or storage tray that moves along with the lift bar and monitor. Wire management for the various wires connecting the monitor, keyboard and mouse to a computer are handled neatly by a corrugated tube that prevents wire pinching.

During operation, the closed unit can be opened by pushing down slightly on the monitor door. The depression of the monitor door relative to the work surface releases the latch mechanism, and the door and monitor will rise automatically to the extended, viewing position as a result of the lift cylinder. The keyboard and mouse can then be removed from the storage tray for use. After use, the keyboard and mouse can be re-stowed and the door with the attached lift bar can be pushed down until the door is flush with the work surface, and the latch mechanism engages to hold the lift bar in its retracted, storage position.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings:

FIG. 7 is a back view of the monitor lift mechanism in the retracted position;

FIG. 8 is a perspective view of the monitor lift mechanism in the extended, viewing position;

FIG. 11 is a sectional view taken on line 11-11 of FIG. 10;

FIG. 12 is a perspective view of the latch mechanism that holds the monitor lift mechanism in the retracted, storage position.

DETAILED DESCRIPTION OF THE INVENTION

Figure 1:
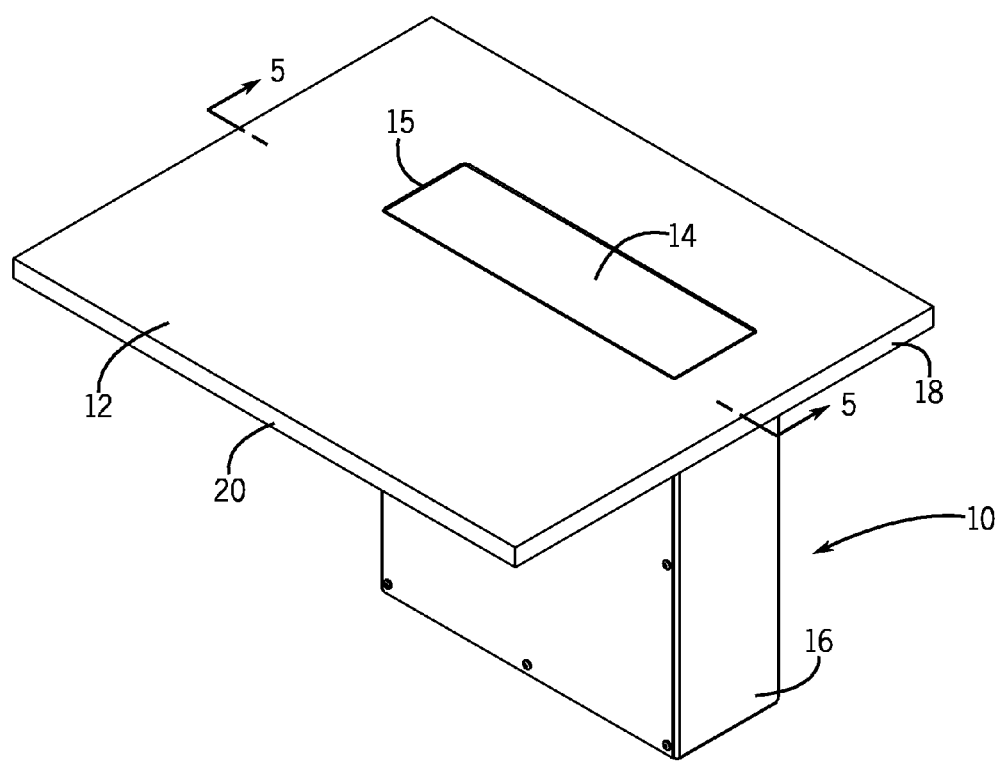
FIG. 1 is a partial perspective view illustrating the monitor lift mechanism in a retracted, storage position and mounted beneath a work surface.

FIG. 1 illustrates a monitor lift mechanism 10 mounted beneath a work surface 12. In the embodiment shown in FIG. 1, the monitor lift mechanism 10 is in a retracted, storage position such that a monitor door 14 is received in a cutout 15 and is generally coplanar with the work surface 12 such that the monitor door 14 and work surface 12 create a unitary work surface. As can be seen in FIG. 1, the monitor lift mechanism 10 includes a metallic housing 16 that is mounted to a lower surface 18 of the work surface 12. The housing 16 is spaced from the front edge 20 such that the knees and legs of a student can extend below the work surface 12, as is conventional.

Figure 2:
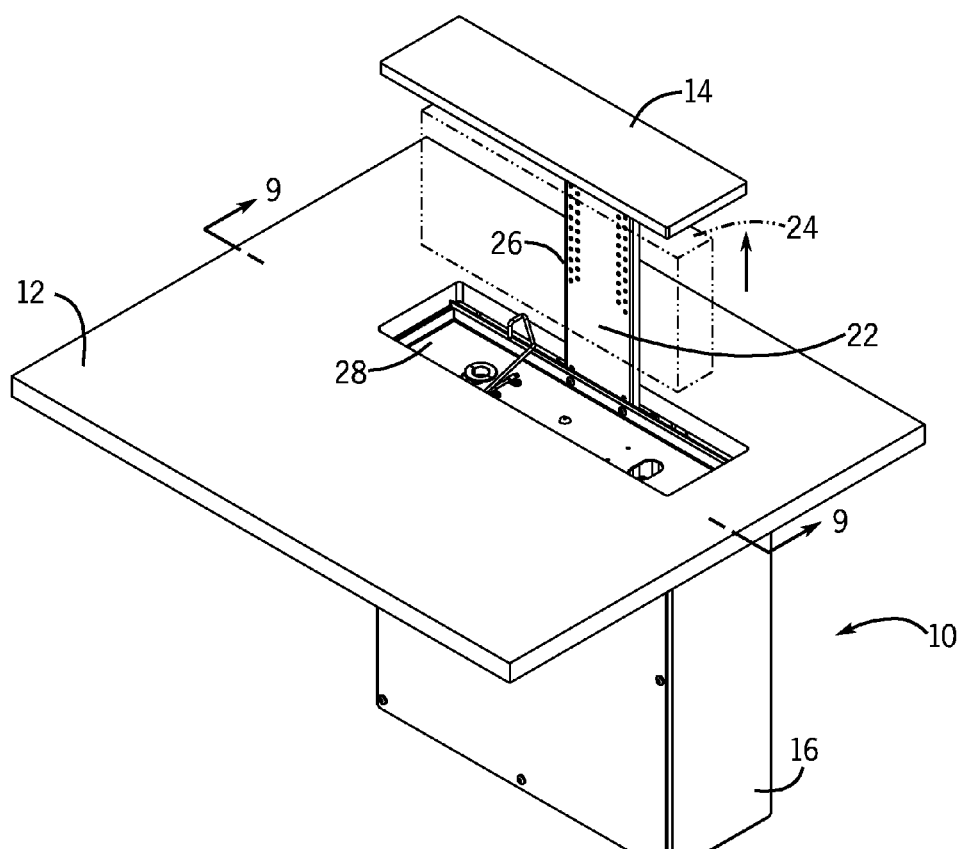
FIG. 2 is a perspective view of the monitor lift mechanism in an extended, viewing position.

FIG. 2 illustrates the monitor lift mechanism 10 in an extended, viewing condition. In the extended position shown in FIG. 2, the monitor door 14 extends above the work surface 12 and is supported by a lift bar 22. In the embodiment of FIG. 2, a video monitor 24 is shown in broken lines and mounted to the lift bar 22. Thus, as the monitor lift mechanism 10 moves to the extended position of FIG. 2, the monitor 24 moves out of the housing 16 to the extended, viewing position shown in FIG. 2. Preferably, the lift bar 22 includes a series of mounting holes 26 that allow the monitor 24 to be securely attached to the lift bar 22.

When the monitor lift mechanism 10 moves to the extended position of FIG. 2, a keyboard tray 28 moves upward and allows the operator to remove a keyboard (not shown).

Figure 3:
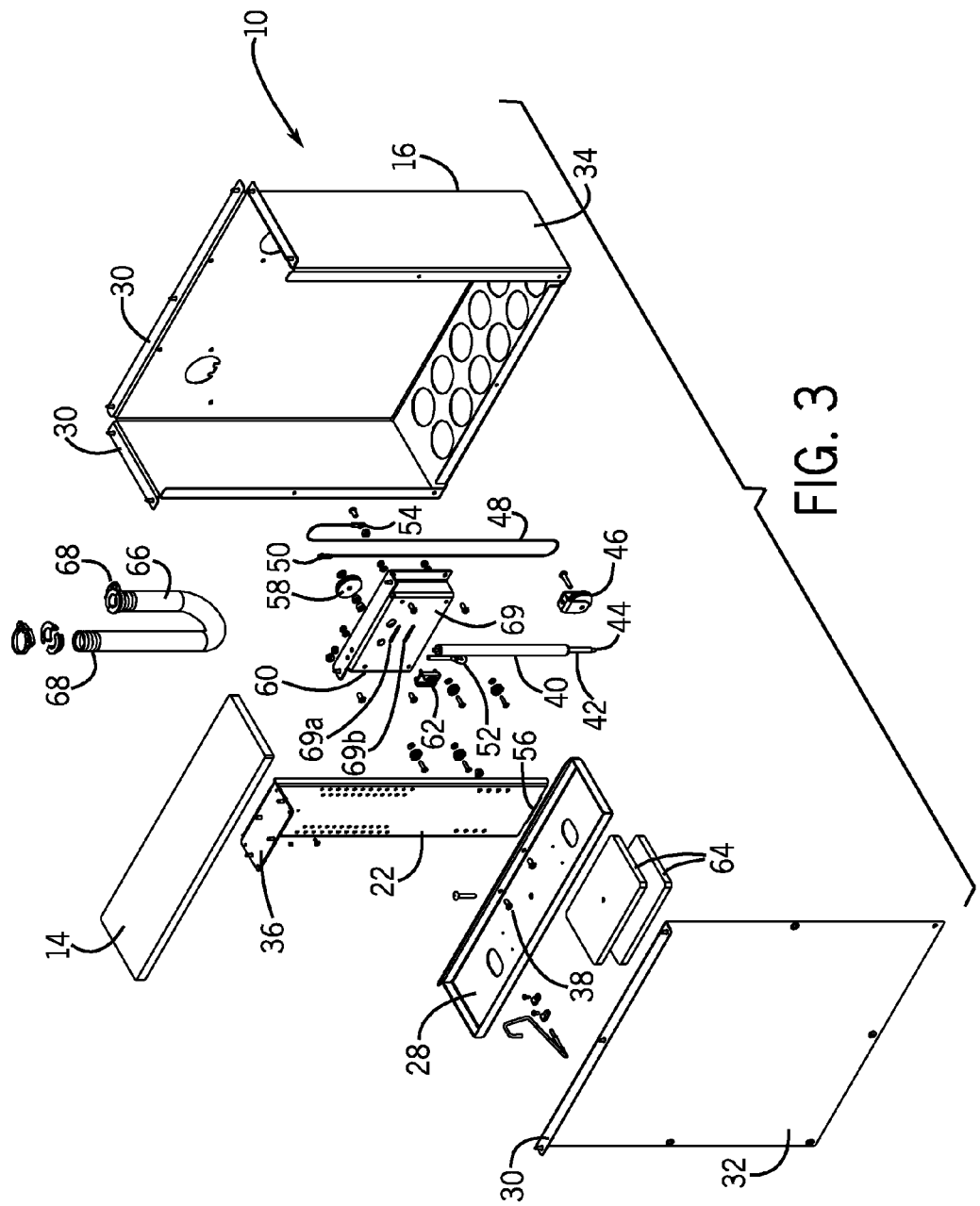
FIG. 3 is an exploded, perspective view of the components of the monitor lift mechanism.
Figure 4:
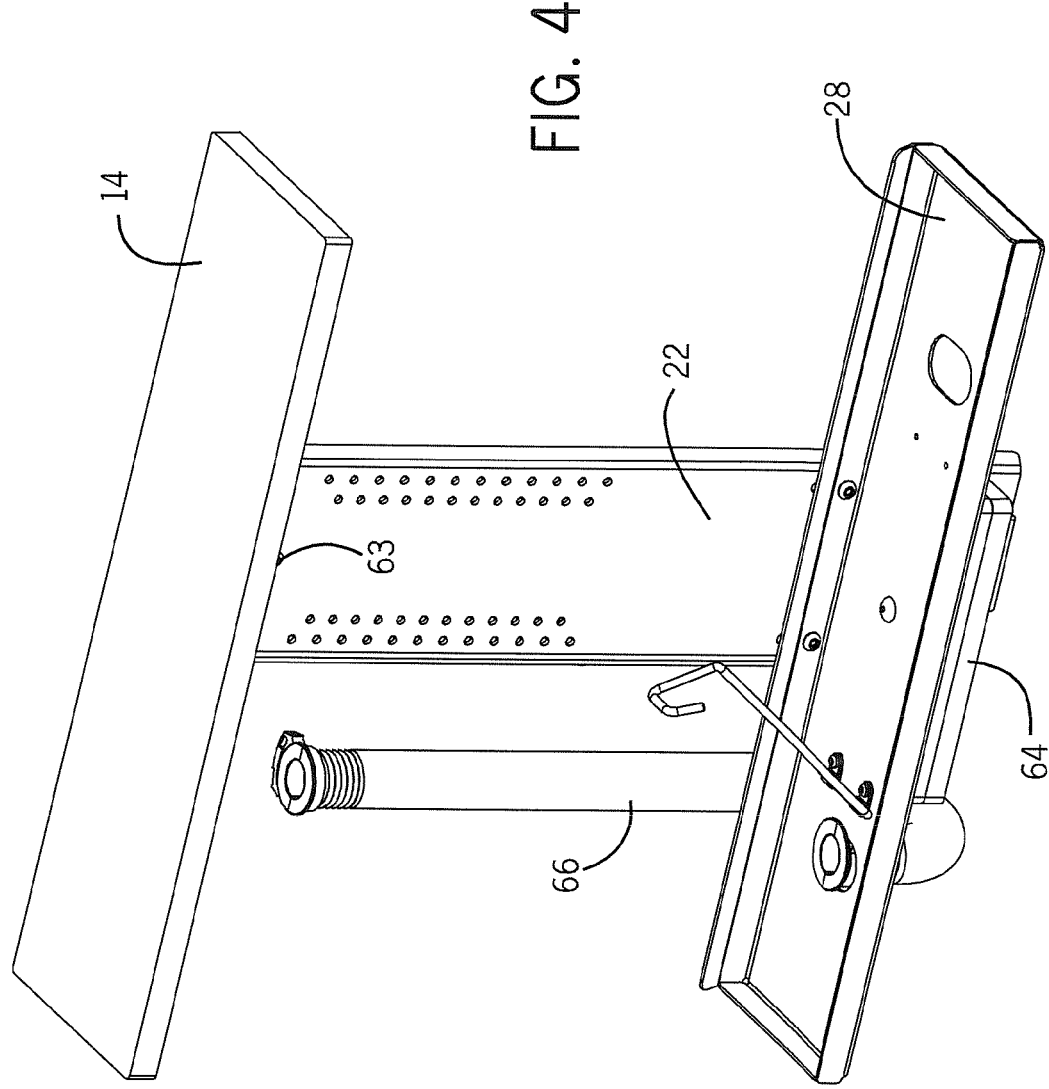
FIG. 4 is a perspective view of the monitor lift mechanism in the retracted position with the housing removed.

FIG. 3 is an exploded, perspective view of the monitor lift mechanism 10. As previously described, the lift mechanism 10 includes a housing 16 that mounts to the bottom surface of the work surface 12 by a series of attachment flanges 30. The housing 16 includes a face plate 32 that mounts to the three-sided shell 34 through a series of connectors. The combination of the face plate 32 and shell 34 completely enclose the operating mechanism, as will be described.

The monitor door 14 is securely attached to a mounting plate 36 formed as part of the lift bar 22. Keyboard tray 28 is also mounted to the lift bar 22 through a series of connectors 38. In this manner, both the keyboard tray 28 and the mounting door 14 move along with the movement of the lift bar 22. The monitor lift mechanism 10 includes a lift cylinder 40, such as a pneumatic or hydraulic cylinder, mounted to the underside of work surface 12, and having an extendable cylinder rod 42. The lower end 44 of the cylinder rod 42 receives a pulley 46.

Figure 5:
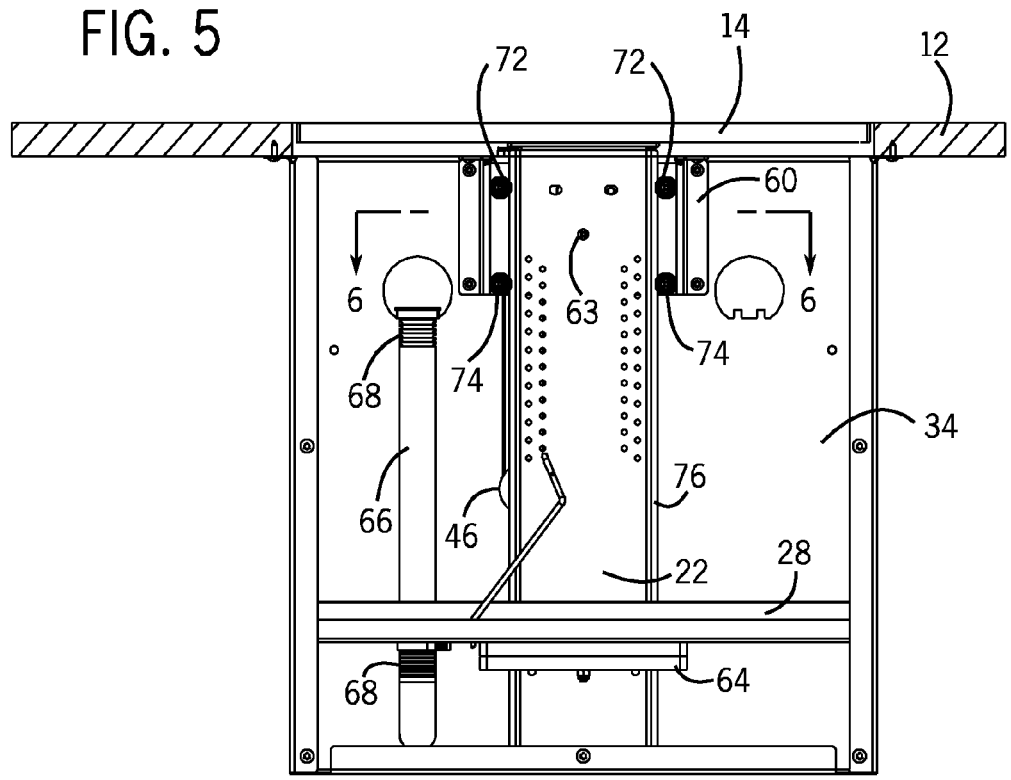
FIG. 5 is a sectional view taken on line 5-5 of FIG. 1.
Figure 6:
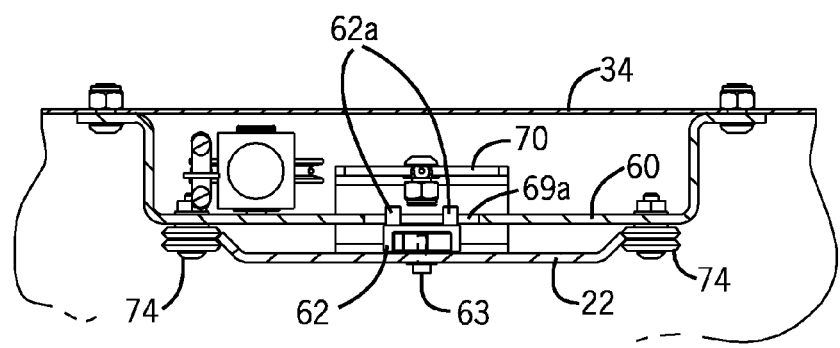
FIG. 6 is a sectional view taken on line 6-6 of FIG. 5.

As will be described in detail below, a lift cable 48 has a first end 50 attached to a fixed bolt 52 and a second end 54 attached to the bottom end 56 of the lift bar 22. An intermediate pulley 58 is securely attached to a roller bracket weldment 60. It can be appreciated that the cylinder rod 42 is engageable with the pulley and cable arrangement 46, 48, 58 extending between the work surface 12 and the lift bar 22. The roller bracket weldment 60 in turn is securely attached to the bottom surface of the work surface 12 as well as to a back wall of shell 34 as seen in FIGS. 5 and 6 to guide the movement of the lift bar 22.

A latch mechanism 62 engages a pin 63 (FIGS. 5 and 6) extending through and attached to the lift bar 22 and holds the monitor lift mechanism 10 in the retracted position until the latching mechanism 62 is released as will be described below. A pair of monitor balancing weights 64 are attached to the keyboard tray 28 to provide balancing of the monitor weight and to facilitate movement of the lift bar 22.

The monitor lift mechanism 10 includes a wire management hose 66 that is corrugated over the entire length between the opposite ends 68. The corrugated construction of the hose 66 allows the hose 66 to extend and contract upon movement of the lift bar 22, as will be described.

The latch mechanism 62 is slidably mounted directly to a front face 69 (FIG. 3) of the roller bracket weldment 60. As seen in FIGS. 6 and 7, projections 62a are provided on a backside of latching mechanism 62 and are mounted in horizontally extending slots 69a, 69b formed in front face 69 to enable sliding movement of latch mechanism 62 back and forth on fixed weldment 60. The latch mechanism 62 is movably mounted directly between the weldment 60 and the lift bar 22, as seen in FIG. 6.

FIGS. 4-7 illustrate the monitor lift mechanism 10 in the retracted, storage condition. In the retracted, storage condition, the monitor 24 is contained and stored within the housing 16 below the work surface 12, as illustrated in FIG. 1.

Referring back to FIG. 7, in the retracted condition, the lift cylinder rod 42 is in its fully retracted condition within the lift cylinder 40. In this position, the second end 54 of the lift cable 48 is securely attached to the bolt 52 mounted to the undersurface of the work surface 12 along with the roller bracket weldment 60. The first end 50 of the lift cable 48 is attached to a bracket 70 formed on the bottom end 56 of the lift bar 22. As previously described, the lift cable 48 extends around an intermediate pulley 58 which is mounted to the roller bracket weldment 60. Since the roller bracket weldment 60 is mounted to the underside of the work surface 12 and the shell 34, the roller bracket weldment 60 is stationary.

Referring now to FIG. 5, the roller bracket weldment 60 includes a pair of upper rollers 72 and lower rollers 74. The upper and lower rollers 72, 74 engage the side edge 76 of the lift bar 22 to guide the lift bar 22 during movement between its extended and retracted positions.

When the monitor lift mechanism 10 is in the retracted position of FIGS. 4-7, the latch mechanism 62 (FIG. 12) engages the pin 63 attached to the lift bar 22 to prevent the lift bar 22 and attached monitor door 14 from moving from the retracted position to the extended position. The latch mechanism 62 includes a latch housing 77 which is movably mounted directly on the weldment and provided with a channel 78 having a notch 80 that receives the pin 63. The shape of the channel 78 guides the pin 63 into different positions with various engagement surfaces of the latch mechanism 62 shown in FIGS. 12 and 12a-12f during movement between the retracted and extended positions. To release the latch mechanism 62, an operator depresses the monitor door 14 (FIG. 12b), which moves the pin 63 out of notch 80 downward against a sloped wall 82 moving latch mechanism 62 along the slots 69a, 69b in the direction of arrow A thereby releasing the pin 63 and allowing the rod 42 of lift cylinder 40 to extend.

Figure 12A:
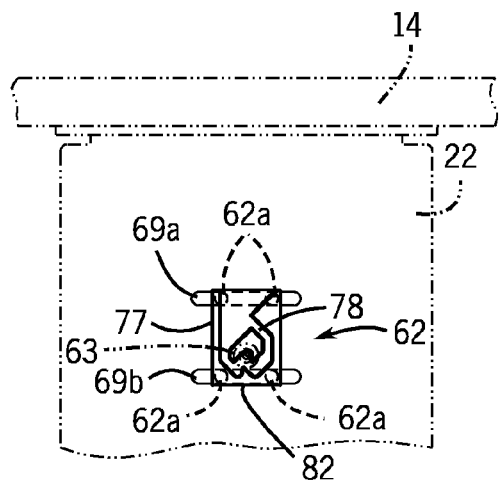
FIGS. 12a-12f are diagrams of the sequential operation of the latch mechanism of FIG. 12 during operation of the monitor lift mechanism.
Figure 12B:
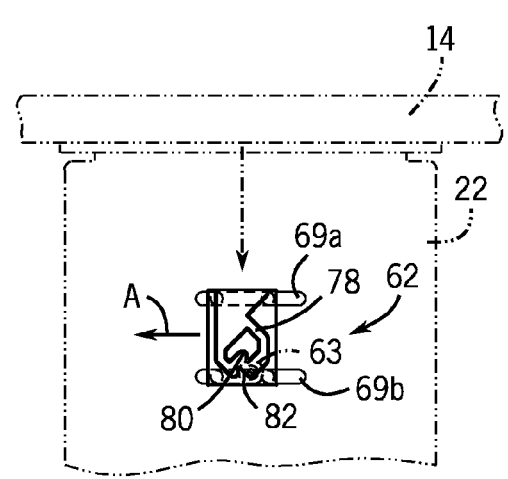
Figure 12C:
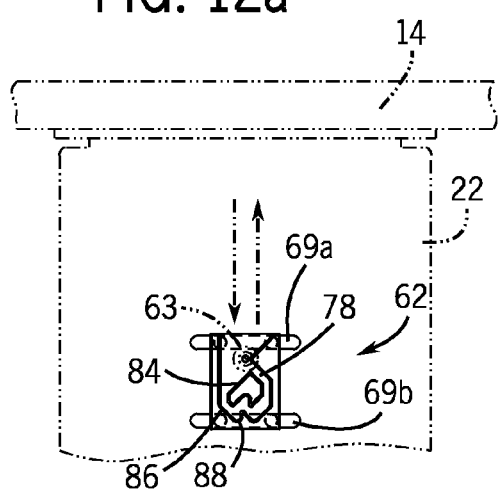
Figure 12D:
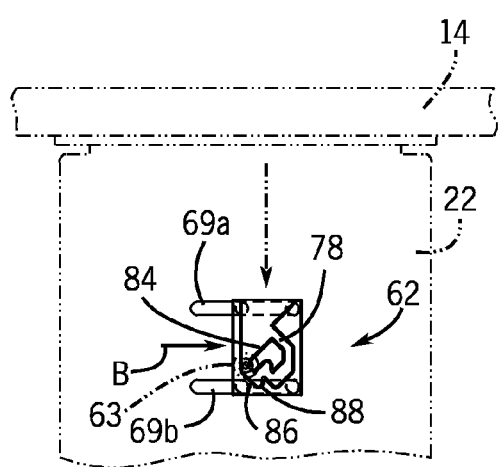
Figure 12E:
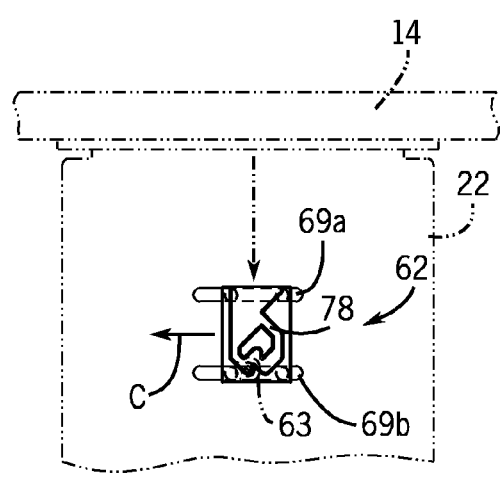
Figure 12F:
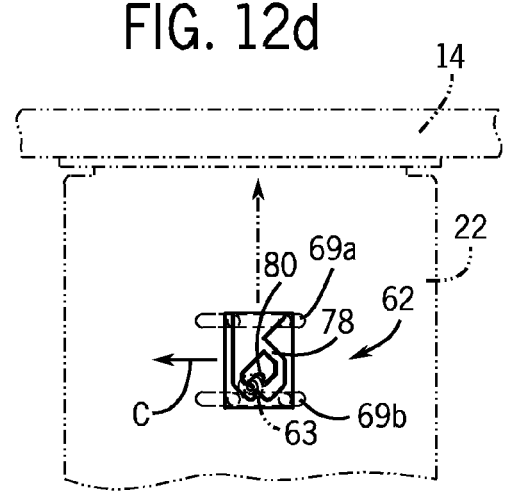

As the rod 42 of lift cylinder 40 extends, the pin 63 travels along the channel 78 to the position shown in FIG. 12c in which the lift bar 22 and the door 14 can be moved upwardly by lift cylinder 40 to the fully extended position. During this motion, the housing 77 of latch mechanism 62 shifts back to a central position along slots 69a, 69b as shown in FIG. 12a. When it is desired to return to the retracted position, the monitor door 14 is pushed down to return the pin 63 to the position of FIG. 12c and further move the pin 63 downwardly along a ramped surface 84 as shown in FIG. 12d. As this occurs, the housing 77 of latch mechanism 62 shifts along slots 69a, 68b in the direction of arrow B. Pin 63 continues to travel in channel 78 along a sloped wall 86 and engages a curved wall 88 as illustrated in FIG. 12e. At this point, releasing the downward push on monitor door 14 causes cylinder 40 to move pin 63 and lift bar 22 upwardly as seen in FIG. 12f so that the pin 63 resets in notch 80 in the FIG. 12a fully retracted position. During the motion represented in FIGS. 12e-12f, the housing 77 of latch mechanism 62 shifts along slots 69a, 69b in the direction of arrow C. It should be appreciated that the channel 78 and the engagement surfaces 80, 82, 84, 86, 88 define a continuous, non-circular path of travel for the pin 63 during movement of the lift bar 22 between the retracted and extended positions. It should also be understood that the channel 78 and engagement surfaces 80, 82, 84, 86, 88 collectively form a latch member fixed to the latch housing 77 for guiding and engaging the pin 63 between the retracted and extended positions.

Figure 9:
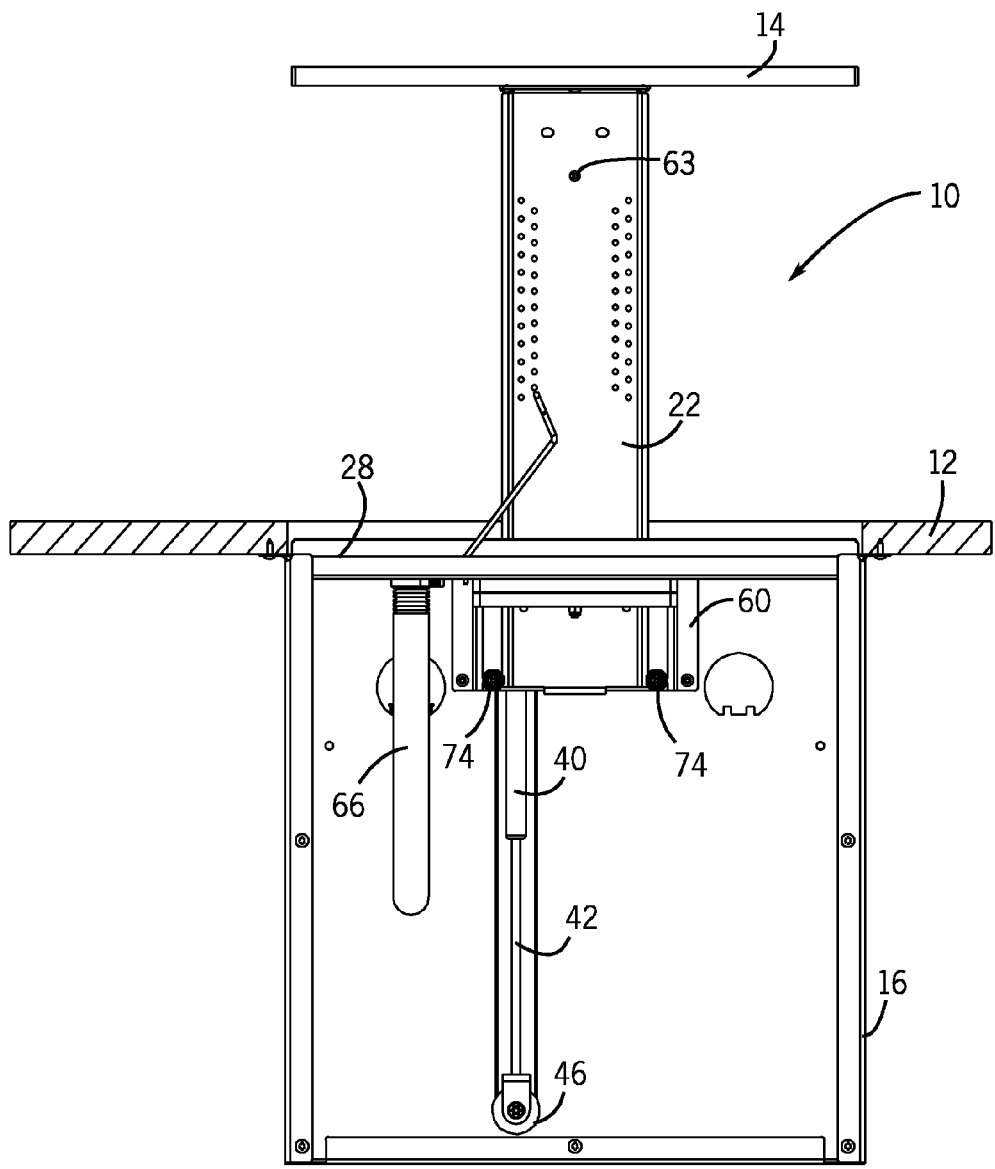
FIG. 9 is a sectional view taken on line 9-9 of FIG. 2.
Figure 10:
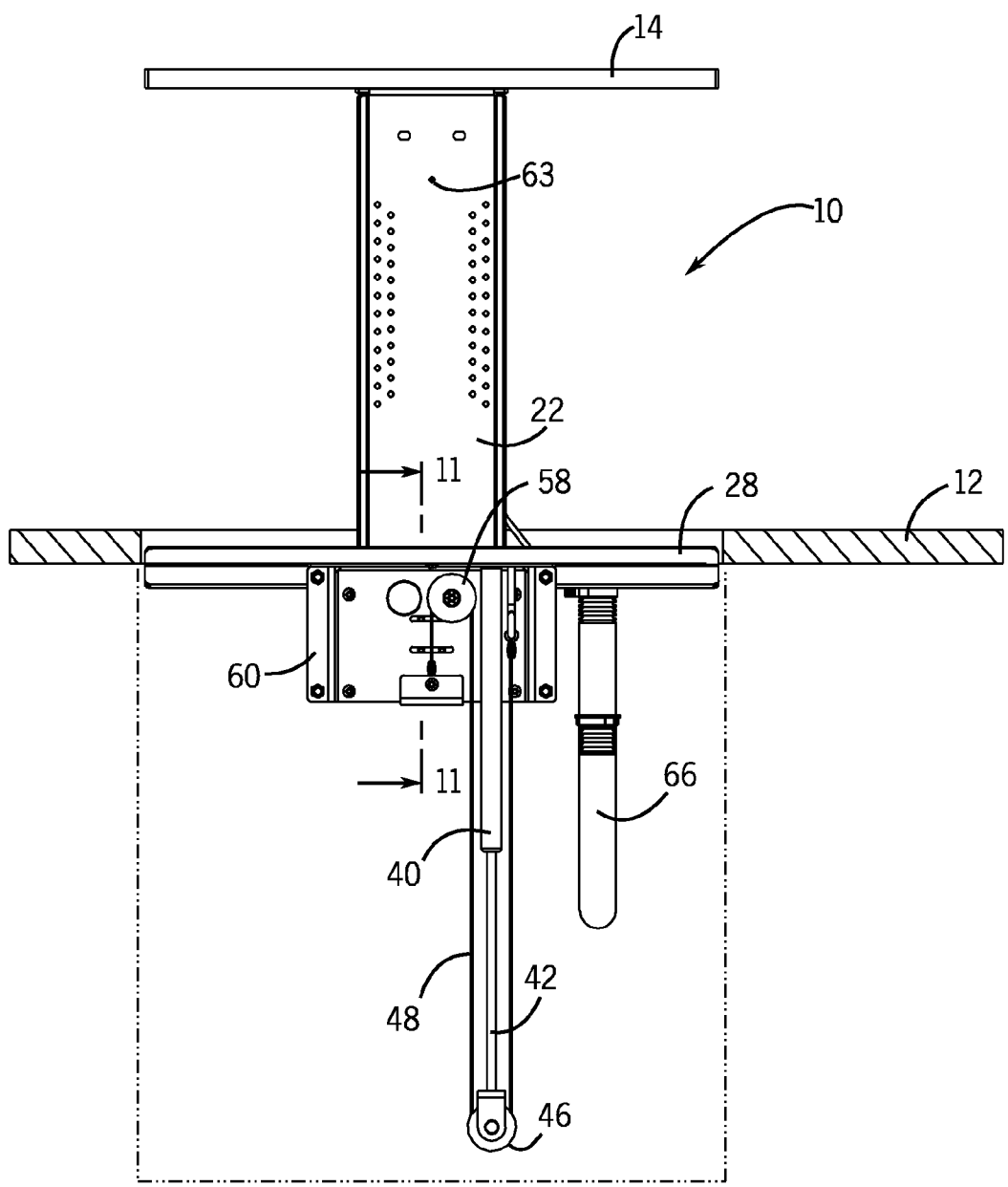
FIG. 10 is a back view of the monitor lift mechanism in the extended position.

FIGS. 8-10 illustrate the monitor lift mechanism 10 in the fully extended viewing position. In the fully extended, viewing position, the lift bar 22 moves relative to the stationary roller bracket weldment 60. During this movement, the monitor door 14 and the keyboard tray 28 move upward to the position shown in FIG. 2. As can be understood in FIG. 2, the monitor 24 is positioned above the work surface 12 when the monitor lift mechanism 10 moves to the fully extended position.

Referring now to FIG. 9, after the pin 63 is released from latching mechanism 62, the lift cylinder 40 operates to extend the lift cylinder rod 42. As the rod 42 extends, the pulley 46 moves along the length of the lift cable 48. Since the second end 54 and the first end 50 of the lift cable 48 are fixed, the extension of the lift cylinder rod 42 causes the lift bar 22 to move upward relative to the fixed roller bracket weldment 60. During this upward movement, the upper and lower rollers 72, 74 engage the side edges 76 of the lift bar 22 and guide the movement of the lift bar 22. As previously described, both the monitor door 14 and the keyboard tray 28 are attached to the lift bar 22 along with the monitor 24. Thus, during movement of the lift bar 22, the keyboard tray 28 moves upward to present the keyboard to a user.

Once a user has completed use of the monitor 24 and keyboard, the keyboard can be placed on the keyboard tray 28, and the mounting door 14 can be pushed downward (FIG. 12d) toward the retracted position. As the lift bar 22 moves downward, the latching mechanism 62 re-engages the pin 63 of lift bar 22 to hold the lift bar 22 and monitor 24 in the retracted position of FIG. 1.

Referring back to FIG. 7, the monitor balance weights 64 are mounted to the keyboard tray 28 to provide counterbalance for the weight of the monitor 24 when the monitor 24 is attached to the lift bar 22. In this manner, the lift cylinder 40 can move the attached monitor 24 without having to exert an extreme amount of force.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

What is claimed is:

1. A monitor lift mechanism for moving a computer monitor above and below a work surface, comprising:
   a lift bar movable between a retracted position and an extended position, wherein the computer monitor is attached to the lift bar;
   a weldment attached to a bottom surface of the work surface so that it is stationary thereon, the weldment being mounted to guide the movement of the lift bar relative thereto by means of rollers mounted on the weldment; and
   a lift cylinder mounted to and extending continuously beneath an underside of the work surface, wherein the lift cylinder includes a cylinder rod which is engageable with a pulley and cable arrangement extending between the work surface and the lift bar such that extension of the cylinder rod moves the lift bar toward the extended position and retraction of the cylinder rod moves the lift bar toward the retracted position.

2. The monitor lift mechanism of claim 1, further comprising a latch mechanism operable to hold the lift bar in the retracted position, wherein release of the latch mechanism allows the lift cylinder to move the lift bar from the retracted position to the extended position.

3. The monitor lift mechanism of claim 1, wherein the pulley and cable arrangement includes a lift cable having a first end connected to the lift bar and a second end secured to the work surface, wherein movement of the cylinder rod causes the lift cable to move the lift bar between the retracted and extended positions.

4. The monitor lift mechanism of claim 1, further comprising a monitor door attached to the lift bar, wherein the monitor door is generally flush with the work surface when the lift bar is in the retracted position, and is raised above the work surface when the lift bar is in the extended position.

5. The monitor lifts mechanism of claim 1, wherein a keyboard tray is attached to the lift bar.

6. The monitor lift mechanism of claim 1, wherein a housing is attached to the work surface and encloses the lift bar, the weldment and the lift cylinder when the lift bar is in the retracted position.

7. The monitor lift mechanism of claim 3, wherein a first pulley is secured to the cylinder rod, and a second pulley is connected to the weldment, the first and second pulleys being engageable with the lift cable.

8. The monitor lift mechanism of claim 2, wherein the latch mechanism is movably mounted directly between the weldment and the lift bar.

9. The monitor lift mechanism of claim 2, wherein the latch mechanism is engageable with a pin attached to the lift bar to prevent the lift bar and the attached monitor from moving from the retracted position to the extended position.

10. The monitor lift mechanism of claim 2, wherein the latch mechanism is provided with a set of projections engageable in slots formed in the weldment so that the latch mechanism is slidably mounted for back and forth movement on the weldment.

11. The monitor lift mechanism of claim 9, wherein the latch mechanism is formed with a channel and various engagement surfaces for guiding the pin during movement between the retracted and extended position.

12. The monitor lift mechanism of claim 2, wherein the latch mechanism is mounted for movement on the weldment as the lift bar moves between retracted and extended positions.

13. The monitor lift mechanism of claim 11, wherein the channel and the engagement surfaces define a continuous path of travel for the pin during movement between the retracted and extended positions.

14. A monitor lift mechanism for moving a computer monitor above a work surface, comprising:
   a lift bar movable between a retracted position and an extended position, wherein the computer monitor is attached to the lift bar;
   a weldment attached to a bottom surface of the work surface so that it is stationary thereon, the weldment being mounted to guide the movement of the lift bar relative thereto by means of rollers mounted on the weldment;
   a lift cylinder mounted to and extending continuously beneath an underside of the work surface, wherein the lift cylinder includes a cylinder rod such that extension of the cylinder rod moves the lift bar towards the extended position and retraction of the cylinder rod moves the lift bar towards the retracted position; and
   a latch mechanism engageable with a pin attached to the lift bar to hold the lift bar in the retracted position, and disengageable with the pin on the lift bar to allow the lift cylinder to move the lift bar to the extended position, wherein the latch mechanism has a latch housing that is movably mounted directly on the weldment during movement of the lift bar between the retracted and extended positions, the latch housing having a latch member fixed thereto for engaging and guiding the pin during movement between the retracted and extended positions and wherein the pin is movable above and below the work surface.

15. The monitor lift mechanism of claim 14, wherein the latch mechanism is movably mounted between the weldment and the lift bar.

16. The monitor lift mechanism of claim 14, wherein the latch mechanism is provided with a set of projections engageable in slots formed in the weldment so that the latch mechanism is slidably mounted for back and forth movement on the weldment.

17. The monitor lift mechanism of claim 14, wherein the latch member is formed with a channel and various engagement surfaces for guiding the pin during movement between the retracted and extended position.

* * * * *